United States Patent
Junod et al.

(10) Patent No.: US 9,817,393 B2
(45) Date of Patent: *Nov. 14, 2017

(54) ADAPTIVE MACHINING OF COMPONENTS

(71) Applicant: Rolls-Royce Corporation, Indianapolis, IN (US)

(72) Inventors: Larry Allen Junod, Greencastle, IN (US); Jeffrey F. Rhodes, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/198,103

(22) Filed: Mar. 5, 2014

(65) Prior Publication Data
US 2014/0257551 A1 Sep. 11, 2014

Related U.S. Application Data

(60) Provisional application No. 61/775,010, filed on Mar. 8, 2013.

(51) Int. Cl.
*G05B 19/42* (2006.01)
*G05B 19/4097* (2006.01)

(52) U.S. Cl.
CPC ..... *G05B 19/4207* (2013.01); *G05B 19/4097* (2013.01); *G05B 2219/35128* (2013.01); *G05B 2219/45147* (2013.01)

(58) Field of Classification Search
CPC ............ G05B 19/4097; G05B 19/4099; G05B 19/4207; G05B 2219/45147
USPC ........................................................ 700/97
See application file for complete search history.

(56) References Cited

U.S. PATENT DOCUMENTS

| | | | | |
|---|---|---|---|---|
| 4,509,126 | A | * | 4/1985 | Olig .................... G05B 19/4163 318/561 |
| 4,937,768 | A | * | 6/1990 | Carver ................ B29C 67/0074 345/420 |
| 4,945,488 | A | * | 7/1990 | Carver ................ B29C 67/0074 700/182 |

(Continued)

FOREIGN PATENT DOCUMENTS

| | | |
|---|---|---|
| EP | 2070641 A2 | 6/2009 |
| GB | 2350809 A | 12/2000 |

OTHER PUBLICATIONS

Mori et al., "A study on energy efficiency improvement for machine tools", CIRP, 2011, 4pg.*

(Continued)

*Primary Examiner* — Ryan Coyer
(74) *Attorney, Agent, or Firm* — Shumaker & Sieffert, P.A.

(57) ABSTRACT

In some examples, an adaptive machining system may include a model comparison unit, a compromise shape determination unit, and a program modification unit. The model comparison unit can be configured to compare electronic measured dimensional surface data of a component with an electronic surface model of the component. The compromise shape determination unit can be configured to determine a compromise shape for the component based on the comparison. The program modification unit can be configured to modify a machine tool program code based on the compromise shape.

17 Claims, 2 Drawing Sheets

(56) References Cited

U.S. PATENT DOCUMENTS

| | | | | |
|---|---|---|---|---|
| 4,956,764 | A * | 9/1990 | Carver | B29C 67/0074 |
| | | | | 33/547 |
| 5,023,800 | A * | 6/1991 | Carver | G05B 19/4097 |
| | | | | 700/182 |
| 5,285,572 | A | 2/1994 | Rathi et al. | |
| 5,288,199 | A * | 2/1994 | Enomoto | H01L 21/67742 |
| | | | | 414/744.6 |
| 5,388,199 | A * | 2/1995 | Kakazu | G05B 19/4097 |
| | | | | 345/420 |
| 6,701,615 | B2 | 3/2004 | Harding et al. | |
| 6,745,101 | B2 | 6/2004 | Andersen et al. | |
| 6,832,128 | B2 | 12/2004 | Haupt | |
| 6,912,446 | B2 | 6/2005 | Wang et al. | |
| 6,969,821 | B2 | 11/2005 | Mika et al. | |
| 7,472,478 | B2 | 1/2009 | Graham et al. | |
| 7,797,828 | B2 | 9/2010 | Beeson et al. | |
| 8,712,577 | B2 * | 4/2014 | Gu | G05B 19/401 |
| | | | | 409/131 |
| 8,844,132 | B2 | 9/2014 | Blais et al. | |
| 8,904,636 | B2 | 12/2014 | Blais et al. | |
| 9,269,189 | B1 * | 2/2016 | Marinov | G06T 17/205 |
| 2003/0004606 | A1 | 1/2003 | Duffin | |
| 2003/0200005 | A1 | 10/2003 | Hirai et al. | |
| 2006/0253270 | A1 | 11/2006 | Nguyen | |
| 2007/0012858 | A1 * | 1/2007 | Callis | B29C 33/38 |
| | | | | 249/134 |
| 2008/0269944 | A1 | 10/2008 | Hoffmann et al. | |
| 2009/0144980 | A1 * | 6/2009 | Rangarajan | B23P 6/007 |
| | | | | 29/889.1 |
| 2009/0319077 | A1 | 12/2009 | Cameron | |
| 2010/0030366 | A1 | 2/2010 | Scherer | |
| 2010/0034029 | A1 | 2/2010 | Xiong et al. | |
| 2010/0095526 | A1 | 4/2010 | Derrien et al. | |
| 2010/0121478 | A1 | 5/2010 | Jahn et al. | |
| 2010/0161107 | A1 | 6/2010 | Kappmeyer et al. | |
| 2012/0154570 | A1 * | 6/2012 | Bunker | F01D 5/005 |
| | | | | 348/86 |
| 2014/0228996 | A1 * | 8/2014 | Owens | G05B 19/401 |
| | | | | 700/114 |
| 2014/0257543 | A1 | 9/2014 | Rhodes et al. | |
| 2016/0259322 | A1 | 9/2016 | Henderkott | |

OTHER PUBLICATIONS

Pham et al., "Micro-EDM—recent developments and research issues", Journal of Materials Processing Technology, 2004, 8pg.*
International Search Report and Written Opinion of counterpart international application No. PCT/US2014/020745, dated Jul. 28, 2014, 11 pp.
International Preliminary Report on Patentability from counterpart International Application No. PCT/US2014/020745, dated Sep. 17, 2015, 9 pp.
Office Action from U.S. Appl. No. 14/197,876, dated May 20, 2016, 19 pp.
Response to Office Action dated May 20, 2016, from U.S. Appl. No. 14/197,876, filed Aug. 22, 2016, 13 pp.
Final Office Action from U.S. Appl. No. 14/197,876, dated Nov. 30, 2016, 18 pp.
Response to Final Office Action dated Nov. 30, 2016 filed on Jan. 30, 2017 for U.S. Appl. No. 14/197,876, dated Nov. 30, 2016, 13 pp.
Advisory Action dated Feb. 13, 2017 for U.S. Appl. No. 14/197,876, dated Nov. 30, 2016, 3 pp.
Office Action from U.S. Appl. No. 14/197,876, dated Mar. 9, 2017, 22 pp.
Response to Office Action from U.S. Appl. No. 14/197,876, dated Mar. 9, 2017, filed Jun. 9, 2017 10 pp.
Notice of Allowance from U.S. Appl. No. 14/197,876, dated Jul. 27, 2017, 5 pp.

* cited by examiner

ADAPTIVE MACHINING OF COMPONENTS

This application claims the benefit of U.S. Provisional Application No. 61/775,010, filed Mar. 8, 2013, which is incorporated herein by reference in its entirety.

TECHNICAL FIELD

The present disclosure relates to an adaptive machining system and technique.

BACKGROUND

Various systems and methods exist for machining components having complex shapes and surfaces that are susceptible to geometric variations, such as blades and vanes of gas turbine engines. Some existing systems and methods have various shortcomings, drawbacks, and disadvantages relative to certain applications. Accordingly, there remains a need for further contributions in this area of technology.

SUMMARY

In some examples, the disclosure describes an adaptive machining system that includes a model comparison unit configured to compare electronic measured dimensional surface data of a component with an electronic surface model of the component. In accordance with this example, the system further includes a compromise shape determination unit configured to determine a compromise shape for the component based on the comparison, and a program modification unit configured to modify a machine tool program code based on the compromise shape.

In some examples, the disclosure describes a method for machining a component that includes measuring geometric surface data of the component to produce electronic measured geometric surface data, comparing the electronic measured geometric surface data with an electronic geometric model of the surface of the component, editing program instructions for a machine tool path based on the comparison to produce edited program instructions, and machining the component based on the edited program instructions.

In some examples, the disclosure describes a method for manufacturing an airfoil that includes measuring coordinate surface data of an airfoil spar surface to produce electronic measured coordinate surface data. In accordance with these examples, the method also includes mathematically comparing the electronic measured coordinate surface data with an electronic curve function model of the airfoil spar surface, modifying numerical control machine instructions for machining the airfoil spar surface based on the comparison to produce modified numerical control machine instructions, and machining the airfoil spar surface based on the modified numerical control machine instructions.

BRIEF DESCRIPTION OF THE FIGURES

Features of the application will be better understood from the following detailed description when considered in reference to the accompanying drawings, in which.

DETAILED DESCRIPTION

Figure 1:
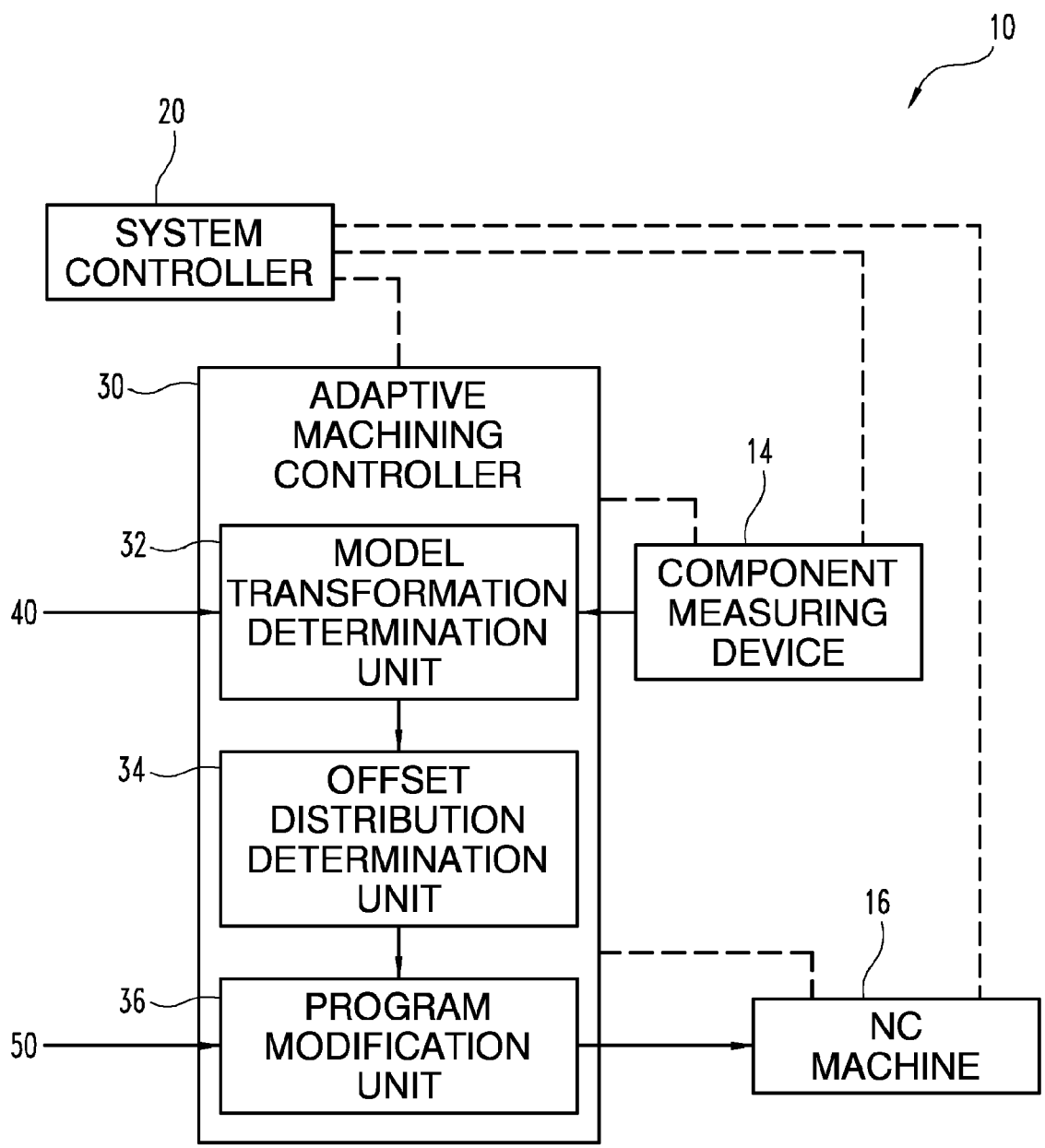
FIG. 1 is a functional block diagram illustrating an example adaptive machining system.

For the purpose of promoting an understanding of the principles of the disclosure, reference will now be made to examples illustrated in the drawings and specific language will be used to describe the same. It will nevertheless be understood that no limitation of the scope of the disclosure is thereby intended. Any alterations and further modifications of the described examples, and any further applications of the principles of the disclosure as described herein, are contemplated as would normally occur to one skilled in the art to which the disclosure relates.

FIG. 1 is a functional diagram illustrating an example adaptive machining system 10. Adaptive machining system 10 of the FIG. 1 is described in the context of machining a gas turbine engine airfoil spar, which is a component of an airfoil such as a blade or vane of a gas turbine engine. However, it will be understood by those of ordinary skill in the art that adaptive machining system 10 is not limited in application to airfoil spars, and other example applications are contemplated. Thus, adaptive machining system 10 of the present disclosure can be applied to the processing of any parts or components having complex shapes and/or surfaces that are susceptible to geometric variations. A few non-limiting examples to which adaptive machining system 10 can be applied include components in the aerospace industry, such as landing gear components or wing and fuselage components; the turbomachinery industry, such as turbine components and compressor components; the automobile industry, such as press tools for body panels; and other manufacturing industries. In some examples, adaptive machining system 10 can be applied to the repair of components, for example the repair of gas turbine engine blades and/or vanes. Adaptive machining system 10 can be used for any suitable machining process including, for example, milling, grinding, and/or polishing, to name a few. In some examples, adaptive machining system 10 can be used where multiple components in a stock or batch have slight variances in their size and/or surface geometries.

In the example illustrated in FIG. 1, adaptive machining system 10 includes a component measuring device 14, a numerical control (NC) machine 16, a system controller 20, and an adaptive machining controller 30. Adaptive machining controller 30 includes a model transformation determination unit 32, an offset distribution determination unit 34, and a program modification unit 36. System controller 20 can be configured to control operation of component measuring device 14, NC machine 16, and adaptive machining controller 30. As will be described in greater detail below, Adaptive machining controller 30 can be configured to compare electronic surface model data of a component such as an airfoil spar to surface data measured by component measuring device 14 and, based on the results of the surface data comparison, adapt machine tool program instructions to be used by NC machine 16.

System controller 20 and adaptive machining controller 30 can be in communication with each other and in communication with component measuring device 14 and NC machine 16 by use of shared memory or communication buses, and/or RF communications. System controller 20 and/or adaptive machining controller 30 can include a microprocessor or multiple microprocessors capable of executing and/or outputting command signals in response to received and/or stored data. In some examples, system controller 20 and/or adaptive machining controller 30 can include computer-readable storage, such as read-only memories (ROM), random-access memories (RAM), and/or flash memories, or any other components for running an application and processing data for controlling operations associated with adaptive machining system 10. Thus, in some examples, system controller 20 and/or adaptive machining controller 30 can include instructions and/or data stored as hardware, software, and/or firmware within the one or more memories, storage devices, and/or microprocessors. In some examples, adaptive machining controller 30 can include and/or be associated with surface modeling circuitry, regression analysis circuitry, program code modification circuitry, switches, and/or other types of circuitry, as suited for an adaptive machining application. In the illustrated example, system controller 20 and adaptive machining controller 30 include multiple controllers. In an alternative embodiment, system controller 20 and adaptive machining controller 30 can include a single controller.

System controller 20 and adaptive machining controller 30 can include one or more data storage structures in a computer-readable medium, or media, containing predetermined data to facilitate operation of adaptive machining system 10 in connection with an algorithm of adaptive machining system 10. The data storage structures can include, for example, equations, arrays, matrices, tables, etc. In some examples, predetermined data can be based on, for example, the material and casting characteristics of a component such as an airfoil spar, the intended shape of the airfoil spar, inspection tolerances, machine tool paths, speed, wear, and cutting time, as well as temperature, pressure, and other machining environmental factors. In some examples, predetermined data may be derived from performance test results, engineering knowledge, and/or other resources. For example, the data storage may include an appropriate amount grinding and polishing, and/or an appropriate tool speed, to effect a desired smoothness or contour of the airfoil spar.

Figure 2:
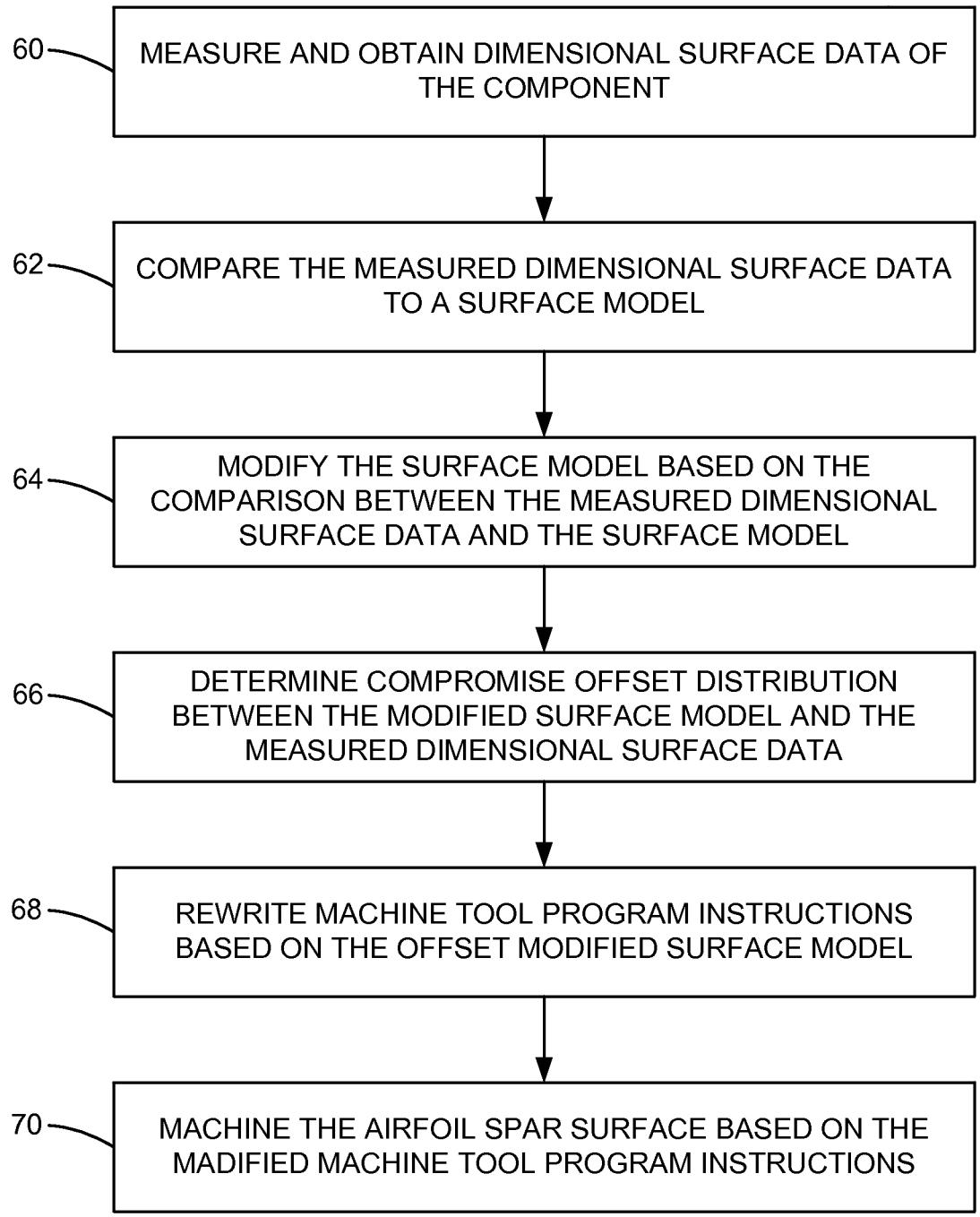
FIG. 2 is a flowchart illustrating an example adaptive machining technique.

FIG. 2 is a flow chart illustrating an example adaptive machining technique performed by adaptive machining system 10. Initially, an airfoil spar that is to be machined is mounted in component measuring device 14 or a mounting fixture of component measuring device 14. For convenience and brevity of description, adaptive machining system 10 will be described hereafter on the basis that the airfoil spar is mounted in a moveable fixture that is moveable between, and therefore aligned substantially the same way in, component measuring device 14 and NC machine 16, such that adaptive machining system 10 analyzes differences in the orientation of the airfoil spar relative to the moveable fixture, and any difference in the orientation of the mounting fixture in the machines is resolved outside of adaptive machining system 10. As will be appreciated by those skilled in the art, adaptive machining system 10 need not be limited to a moveable-type mounting fixture, and other examples are contemplated. For example, each of component measuring device 14 and NC machine 16 can have its own mounting fixture. In other examples, component measuring device 14 and NC machine 16 can be the same machine so that there is no transferring of the airfoil spar mounting fixture, or the airfoil spar, from component measuring device 14 to NC machine 16 is necessary.

System controller 20 can be configured to control component measuring device 14 to measure and obtain dimensional surface data of the airfoil spar (60). Component measuring device 14 can include any suitable machine capable of measuring dimensional surface data of the airfoil spar. In some examples, component measuring device 14 can include, for example, a coordinate measuring machine (CMM) that determines coordinates of points at multiple locations of the airfoil spar surface. Component measuring device 14 can additionally and/or alternatively measure geometric characteristics other than and/or related to the dimensional surface data of the airfoil spar. In some examples, component measuring device 14 can measure and obtain data points in six degrees of freedom, for example, translation and rotation with respect to three different perpendicular axes. The measured dimensional surface data can include any number, or set or multiple sets, of point coordinates that component measuring device 14 determines to be on the surface of the airfoil spar at various (different) locations. As will be appreciated, the greater the number of points, which can be in the hundreds to millions or more, in a set or multiple sets, the more robust the measured dimensional surface data will be in establishing the shape (and location) of the airfoil spar.

Component measuring device 14 supplies the measured dimensional surface data of the airfoil spar to model transformation determination unit 32 of adaptive machining controller 30. Model transformation determination unit 32 compares the measured dimensional surface data to an electronic surface model 40 of the airfoil spar (62). Electronic surface model 40 can be supplied by, for example, system controller 20, and/or a user interface, and/or over a network connection, to name a few. Electronic surface model 40 can comprise any suitable mathematical model, for example, in the form of one or more curves or surfaces, including splines or non-uniform rational basis splines (NURBS), for example, that represent (model) the airfoil spar surface. In some examples, electronic surface model 40 can include a design intent surface of the airfoil spar, defined by, for example, CAD spline knots. In some examples, the design intent surface can represent the ideal surface of the airfoil spar, that is the "perfect world" representation of the component surface, before, for example, the consideration of tolerances.

In some examples, when comparing the measured dimensional surface data to electronic surface model 40 of the airfoil spar (62), model transformation determination unit 32 can compare a set of the measured dimensional surface data to a location of the design intent surface that is interpolated from the CAD spline knots. In some examples, component measuring device 14 can determine the coordinates of the points in a set relative to the coordinate system of component measuring device 14, and model transformation determination unit 32 can determine the coordinates of the same points relative to the coordinate system in which the airfoil spar was designed, such as the design intent surface of the airfoil spar.

Model transformation determination unit 32 of adaptive machining controller 30 can be configured to modify the electronic surface model 40 based on the comparison between the measured dimensional surface data and electronic surface model 40 (64). Alternatively, model transformation determination unit 32 can be configured to output the results of the comparison between the measured dimensional surface data and electronic surface model 40 to offset distribution determination unit 34 and/or program modification unit 36, both or either of which can be configured to modify electronic surface model 40, or a portion thereof, based on the comparison. Alternatively and/or additionally, model transformation determination unit 32, offset distribution determination unit 34, and program modification unit 36, can modify a portion of electronic surface model 40 based on the comparison. For purposes of brevity, the description herein describes modification of electronic surface model 40 by model transformation determination unit 32.

In some examples, model transformation determination unit 32 (and/or offset distribution determination unit 34 and/or program modification unit 36) can be configured to modify electronic surface model 40 by performing a six degree of freedom (DOF) best-fit of electronic surface model 40 to the measured dimensional surface data. In some examples, model transformation determination unit 32 best-fits electronic surface model 40, such as the design intent surface, to the measured dimensional surface data to account for possible misalignment caused by, for example, uncertainty in the orientation of the airfoil spar in the mounting fixture of the component measuring device 14. Model transformation determination unit 32 need not be limited to modification of electronic surface model 40, and other embodiments are contemplated. Thus, for example, model transformation determination unit 32 can additionally and/or alternatively be configured to modify the measured dimensional surface data based on the comparison between the measured dimensional surface data and electronic surface model 40. In some examples, model transformation determination unit 32 can be configured to perform a best-fitting procedure to account for possible misalignment, for example, by transforming either the coordinates of electronic surface model 40 or the coordinates of the measuring dimensional surface data by three (each) rigid-body translations and rotations.

In some examples, model transformation determination unit 32 can modify the design intent surface defined by the CAD spline knots. For example, model transformation determination unit 32 can rotate and translate the design intent surface definition, or a subset of the design intent surface definition, to best-fit the measured dimensional surface data, or a subset of the measured dimensional surface data. In some examples, the rotation and translation can compensate for misalignment of the airfoil spar in the mounting fixture of component measuring device 14 (or misalignment of the airfoil spar in component measuring device 14). As will be appreciated, any number of factors can contribute to misalignment of the airfoil spar. For example, the airfoil spar could be misaligned in the mounting fixture of component measuring device 14 because of operator error, or because the airfoil spar has a local shape deviation at the location of one of the contact points that determine the airfoil spar's position in the mounting fixture of component measuring device 14. In some examples, model transformation determination unit 32 can be configured to determine what rigid body translations and rotations can make the airfoil spar appear closest to, or substantially closest to, the design intent surface. In other examples, for example in instances in which there is relatively minimal or no misalignment, model transformation determination unit 32 can be configured to perform best-fit rigid body rotations and translations to reduce the amount of machining required to make an acceptable airfoil spar, as it reorients the deviated airfoil spar to make it fit closest into, or substantially closest into, a desired shape envelope.

In some examples, model transformation determination unit 32 can be configured to modify electronic surface model 40 using any suitable numerical analysis. For example, model transformation determination unit 32 can use a weighted nonlinear least squares minimization to rotate and translate the design intent definition. Further, any suitable method for solving multidimensional nonlinear problems can be employed; non-limiting examples include Newton-Raphson, sequential over-relaxation, genetic algorithms, gradient methods, among others.

In the illustrated example, model transformation determination unit 32 outputs the modified electronic surface model, for example in the form of coordinates of the modified design intent definition (spline knots), to offset distribution determination unit 34 of adaptive machining controller 30. Offset distribution determination unit 34 can be configured to determine a compromise offset distribution between the modified electronic surface model and the measured dimensional surface data (66). In other examples, model transformation determination unit 32 can be configured to output the modified electronic surface model to program modification unit 36, and program modification unit 36 can be configured to apply a compromise offset distribution to the modified electronic surface model, where offset distribution determination unit 34 determines the compromise offset distribution between electronic surface model 40 and the measured dimensional surface data. For purposes of brevity, the description that follows describes determining the compromise offset distribution between the modified electronic surface model and the measured dimensional surface data, it being understood that the description can apply similarly to a compromise offset distribution between electronic surface model 40 and the measured dimensional surface data.

Factors that offset distribution determination unit 34 can be configured to consider in determining the compromise offset distribution include component functionality and subsequent manufacturing steps. For example, offset distribution determination unit 34 can be configured to consider retaining actual shape of the deviated component as-is, for example, to avoid extensive re-machining; achieving the original desired shape, for example, the design intent definition; achieving functionality requirements, including, but not limited to, smoothness, of the final component in the gas turbine engine; and/or achieving smoothness requirements for subsequent manufacturing processing of the component. As will be appreciated, attempting to meet one factor can invariably increase the extent to which another factor is missed. Consequently, offset distribution determination unit 34 can be configured to determine a compromise offset determination by compromising amongst the factors to produce a component compromise offset distribution.

In some examples, offset distribution determination unit 34 can be configured to determine the compromise offset distribution by morphing, that is smoothing, the modified electronic surface model, while adhering to specified constraints, that is tolerances, on contour and rate of contour deviation. Thus, in some examples, offset distribution determination unit 34 can be configured to determine a compromise offset distribution on the coordinates of the modified design intent definition (spline knots) data to obtain a compromised airfoil spar surface that is a compromise between the modified design intent definition (spline knots) data and the measured dimensional surface data provided by component measuring device 14.

In some examples, offset distribution determination unit 34 can determine a set of spline knots that include the locations at which offsets are defined and optimized by offset distribution determination unit 34. In some examples in which the compromise offset distribution is to be incorporated into the modified design intent definition (or design definition), the compromise offset distribution can be done at all of the spline knots of the modified design intent definition (or design definition). In some examples in which there is more than one parametric spline surface defining the airfoil spar, each such surface can have its own compromise offset distribution. Offset distribution determination unit 34 can determine the compromise offset distribution as a function of the chordwise and spanwise location of the airfoil spar surface, that is the chordwise and spanwise spline parameters that map locations on the airfoil spar.

In some examples, offset distribution determination unit 34 can be configured to force or guide the offset distribution to be sufficiently "smooth", that is control smoothness, by adjusting the number of spline knots that define the compromise offset distribution. For example, offset distribution determination unit 34 can be configured to limit the number spline knots at which the offset values are optimized. Coarse spline interpretations having relatively fewer knots are typically smoother than fine spline interpretations having relatively more knots. In other examples, offset distribution determination unit 34 can be configured to specify a constraint or tolerance on the magnitude and slope of the offset. For example, offset distribution determination unit 34 can constrain the rate of change of the interpolated offset distribution with respect to distance (location) around the airfoil spar.

In some examples, offset distribution determination unit 34 can be configured to determine a compromise offset distribution using any suitable numerical analysis. For example, offset distribution determination unit 34 can be configured to use a weighted nonlinear least squares minimization to define the compromise offset distribution. Further, any suitable method for solving multidimensional nonlinear problems can be employed; non-limiting examples include Newton-Raphson, sequential over-relaxation, genetic algorithms, gradient methods, among others.

In some examples, offset distribution determination unit 34 can be configured to output the compromise offset distribution to program modification unit 36 of adaptive machining controller 30. Offset distribution determination unit 34 can be configured to pass the compromise offset distribution to program modification unit 36 in any number of ways. For example, offset distribution determination unit 34 can communicate the compromise offset distribution data to program modification unit 36, where program modification unit 36 can apply the compromise offset distribution data to electronic surface model 40, such as the design intent definition, or to the modified electronic surface model such as the modified design intent definition. As another example, offset distribution determination unit 34 can apply the compromise offset distribution to electronic surface model 40, or to the modified electronic surface model, so that program modification unit 36 sees only the offset electronic surface model, or the offset modified electronic surface model. In the latter example, each coordinate of electronic surface model 40 (e.g., design intent definition), or modified electronic surface model (e.g., modified design intent definition), is moved normal to the original electronic surface model surface (e.g., design intent definition surface), or the modified electronic surface model surface (e.g., modified design intent definition surface), by the magnitude of the offset interpolated at that location. For purposes of brevity, the description that follows describes program modification based on an electronic surface model that has been modified and offset, it being understood that the description can apply similarly to an electronic surface model that is modified and/or offset by program modification unit 36.

In some examples, program modification unit 36 is configured to modify, for example by rewriting, machine tool program instructions 50 based on the offset modified electronic surface model supplied by offset distribution determination unit 34 (68). Machine tool program instructions 50 provide instructions, for example in G-code language, for controlling a machine tool path of NC machine 16. Machine tool program instructions 50 can be supplied by, for example, system controller 20, and/or a user interface, and/or over a network connection, to name a few. Machine tool program instructions 50 can comprise any suitable control instructions for the machine tool, for example, instructions for feed rate, spindle speed, axes motion, among others.

In some examples, machine tool program instructions 50 include the machine tool program instructions developed for milling the design intent airfoil spar surface, that is, the originally coded program instructions for the airfoil spar surface, and program modification unit 36 modifies machine tool program instructions 50 (for example, the G-code) line by line to reshape the design intent airfoil spar surface to the offset modified electronic surface model, that is the compromised contour, supplied by offset distribution determination unit 34.

In some examples, program modification unit 36 supplies the modified machine tool program instructions to NC machine 16, and NC machine 16 machines the airfoil spar surface based on the modified machine tool program instructions (70). System controller 20 can be configured to control NC machine 16, or NC machine 16 can have its own control system. In some examples, NC machine 16 can include a numerically controlled milling machine that mills the airfoil spar surface.

Adaptive machining controller 30 enables a user flexibility relative to handling the various data. A user can choose to incorporate changes into electronic surface model 40 or pass along the changes to be applied to the previous model by the next unit, with respect to both model transformation determination unit 32 to offset distribution determination unit 34 and offset distribution determination unit 34 to program modification unit 36. In some examples, program modification unit 36 can be configured to read electronic surface model 40, for example, a design definition, and the updates from both model transformation determination unit 32 and offset distribution determination unit 34 and apply them both before program modification unit 36 proceeds with modifying machine tool program instructions 50.

The described adaptive machining system 10, and its function, can be employed in the manufacture of a gas turbine engine airfoil, for example, a complexly cooled multi-walled airfoil, from a casting such as a simple single walled casting. Thus, initially an airfoil spar casting can be provided that has an outer surface comprising a plurality, for example hundreds to thousands, of pedestals. In some examples, the pedestals serve to cool the airfoil during operation of the gas turbine engine. In some examples, the overall contour tolerance of the as-cast bond surface can be +/−0.0075 inch (plus/minus 0.0075 inch). Coversheets may be later bonded to the tops, or distal ends, of the pedestals, and thus it is desirable that the tops of the pedestals define a smooth and continuous surface.

To prepare the as-cast bond surface for such coversheet bonding, that is, to prepare a smooth and continuous surface, material is removed from the as-cast airfoil spar. The material can be removed by any suitable means, for example, by high speed milling or a similar process. In some examples, adaptive machining system 10 can be configured to remove the material, for example about 0.001 to 0.002 inch of material, from the airfoil spar surface. In doing so, adaptive machining system 10 can carry out the technique of the FIG. 2 flowchart, as described above, or any alternative example or form thereof, as described above. In some examples, NC machine 36 of adaptive machining system 10 machines the airfoil spar surface to within a +/−0.001 inch (plus/minus 0.001 inch) pedestal height tolerance. In some examples, NC machine 36 can machine the airfoil spar surface to have a "smooth and continuous" contour, for example, when the rate of contour deviation in the contour is within 0.005 in/in (0.005 inch/inch).

After adaptive machining system 10 prepares the airfoil spar surface to have a smooth and continuous surface, one or more coversheets can be bonded to the plurality of pedestals. Adaptive machining system 10 can further include a bonding machine that, for example, metallurgically bonds the coversheet, or multiple coversheets, to the airfoil spar surface, more specifically to the tops of the pedestals, to produce an airfoil spar.

Any theory, mechanism of operation, proof, or finding stated herein is meant to further enhance understanding of examples of the present disclosure and is not intended to make the present disclosure in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While examples have been illustrated and described in detail in the drawings and foregoing description, the same are to be considered as illustrative and not restrictive in character, it being understood that only the selected examples have been shown and described and that all changes, modifications and equivalents that come within the spirit of the disclosure as defined herein of by any of the following claims are desired to be protected. It should also be understood that while the use of words such as preferable, preferably, preferred or more preferred utilized in the description above indicate that the feature so described may be more desirable, it nonetheless may not be necessary and examples lacking the same may be contemplated as within the scope of the disclosure, the scope being defined by the claims that follow.

What is claimed is:

1. An adaptive machining system comprising:
   a numerical control (NC) machine configured to machine a component based on a machine tool program code;
   a model comparison unit configured to compare electronic measured dimensional surface data of the component with an electronic surface model of the component;
   a compromise shape determination unit configured to determine a compromise shape for the component based on the comparison, wherein the compromise shape determination unit comprises a model transformation determination unit configured to modify the electronic surface model based on the comparison, wherein the compromise shape determination unit comprises an offset distribution determination unit that is configured to determine a compromise offset distribution between the modified electronic surface model and the electronic measured dimensional surface data, wherein the offset distribution determination unit is configured to apply the compromise offset distribution to the modified electronic surface model to have a rate of contour deviation within a predetermined tolerance of 0.005 inch/inch; and
   a program modification unit configured to modify the machine tool program code based on the compromise shape by modifying at least one line of the machine tool program code.

2. The adaptive machining system of claim 1, wherein the compromise shape determination unit is configured to determine the shape for the component based on component functionality and subsequent manufacturing steps.

3. The adaptive machining system of claim 1, wherein the electronic surface model comprises a surface model defined by CAD (Computer-Aided Design) spline knots.

4. The adaptive machining system of claim 1, wherein the model transformation determination unit is configured to modify the electronic surface model using a weighted non-linear least squares minimization problem.

5. The adaptive machining system of claim 1, wherein the electronic surface model comprises a design intent surface of the component, and wherein the model transformation determination unit is configured to rotate and translate the design intent surface to best-fit the electronic measured dimensional surface data of the component.

6. The adaptive machining system of claim 1, wherein the compromise shape determination unit is configured to adjust the degree of compromise offset distribution based on a number of CAD (Computer-Aided Design) spline knots that define the compromise offset distribution.

7. The adaptive machining system of claim 1, wherein the offset distribution determination unit is configured to specify a tolerance on the magnitude and slope of the compromise offset distribution.

8. The adaptive machining system of claim 1, wherein the program modification unit is configured to modify the machine tool program code based on the compromise offset distribution.

9. The adaptive machining system of claim 1, wherein the program modification unit is configured to modify the machine tool program code based on the modified electronic surface model and the compromise offset distribution.

10. A method for machining a component comprising:
    measuring geometric surface data of the component to produce electronic measured geometric surface data;
    comparing the electronic measured geometric surface data with an electronic geometric model of the surface of the component;
    changing the electronic geometric model based on the comparison to generate a changed electronic geometric model;
    determining a compromise offset distribution between the changed electronic geometric model and the electronic measured geometric surface data;
    applying the compromise offset distribution to the changed electronic geometric model to have a rate of contour deviation within a predetermined tolerance of 0.005 inch/inch;
    editing program instructions for a machine tool path by modifying at least one line of the program instructions based on the comparison to produce edited program instructions; and
    machining the component based on the edited program instructions.

11. The method of claim 10, wherein the electronic geometric model is defined by CAD (Computer-Aided Design) spline knots, and wherein comparing the electronic measured geometric surface data with the electronic geometric model of the surface of the component comprises comparing a set of the electronic measured geometric surface data to a location of the electronic geometric model of the surface of the component that is interpolated from the CAD spline knots.

12. The method of claim 10, further comprising:
    morphing the changed electronic geometric model between the changed electronic geometric model and the electronic measured geometric surface data, wherein editing program instructions for a machine tool path based on the comparison to produce edited program instructions comprises editing the program instructions for the machine tool path based on the morphed model.

13. The method of claim 12, wherein changing the electronic geometric model based on the comparison comprises rotating and translating the electronic geometric model to best-fit the electronic measured geometric surface data.

14. A method for manufacturing an airfoil comprising:
measuring coordinate surface data of an airfoil spar surface to produce electronic measured coordinate surface data;
mathematically comparing the electronic measured coordinate surface data with an electronic curve function model of the airfoil spar surface;
changing the electronic curve function model based on the comparison to generate a changed electronic curve function model;
determining a compromise offset distribution between the changed electronic curve function model and the electronic measured coordinate surface data;
applying the compromise offset distribution to the changed electronic curve function model to have a rate of contour deviation within a predetermined tolerance of 0.005 inch/inch;
modifying numerical control machine instructions by modifying at least one line of the numerical control machine instructions for machining the airfoil spar surface based on the comparison to produce modified numerical control machine instructions; and
machining the airfoil spar surface based on the modified numerical control machine instructions.

15. The method of claim 14 further comprising
smoothing the electronic curve function model based on the comparison, wherein modifying numerical control machine instructions for machining the airfoil spar surface comprises modifying numerical control machine instructions based on the smoothed electronic curve function model.

16. The method of claim 14 further comprising
casting an airfoil spar including a plurality of pedestals in which the distal ends of the pedestals define the airfoil spar surface; and
covering the distal ends of the pedestals with one or more coversheets.

17. The method of claim 16 in which the machining comprises machining about 0.001 to 0.002 inch from the airfoil spar surface.

* * * * *